April 5, 1966
J. R. HANNING
3,244,405
CABLE HOIST BRAKE
Filed Feb. 17, 1964
2 Sheets-Sheet 1
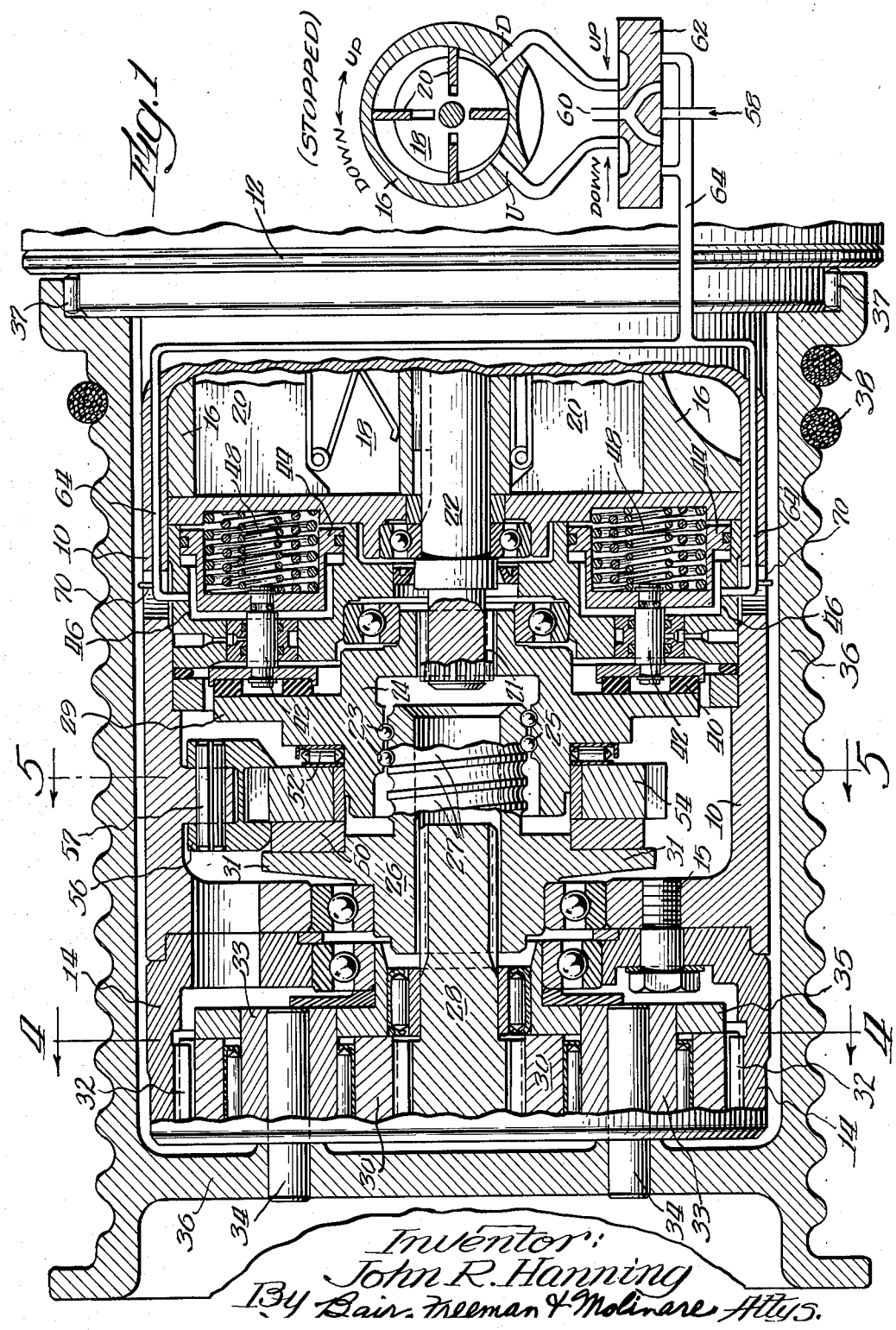

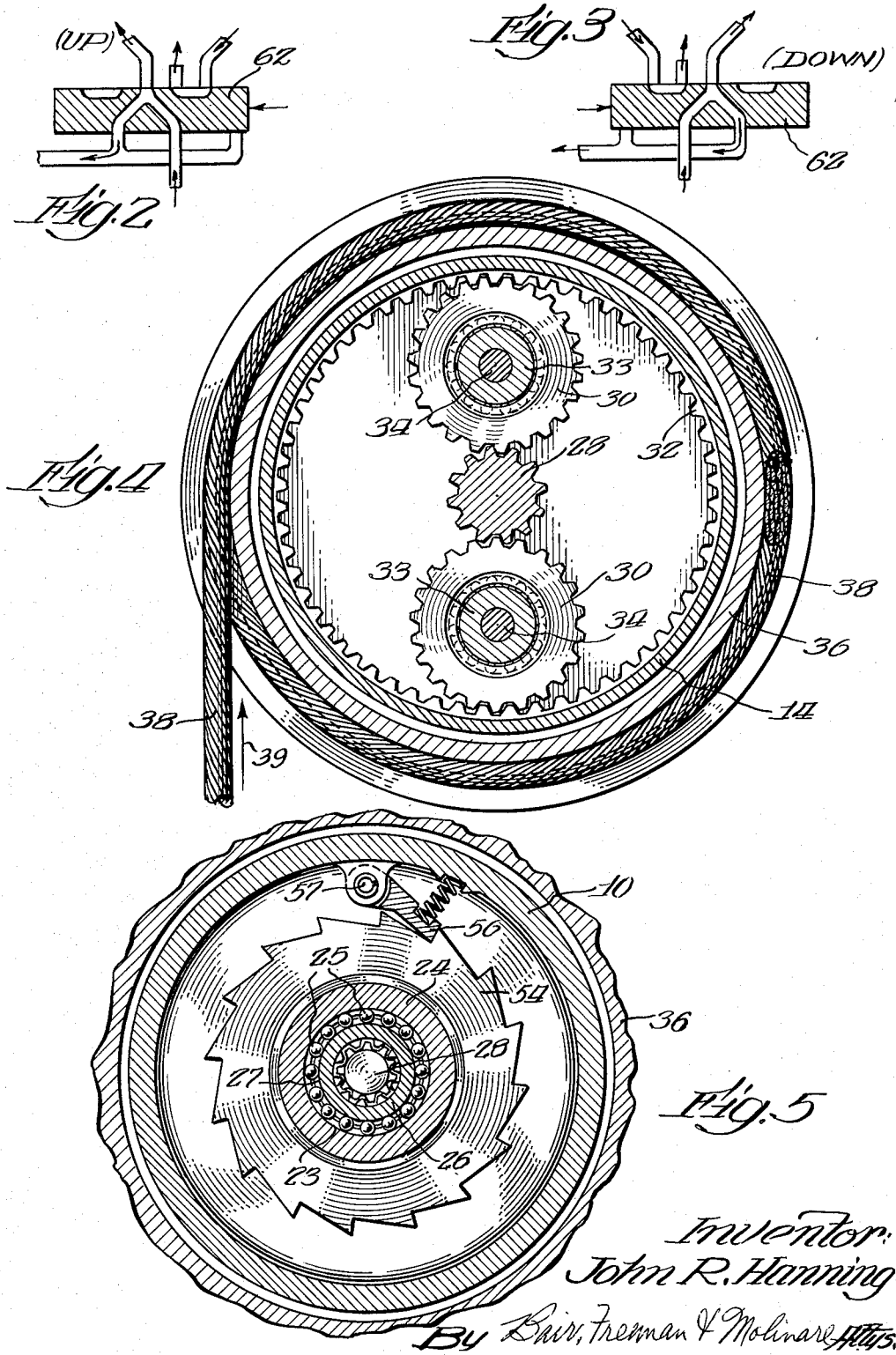

United States Patent Office

3,244,405
Patented Apr. 5, 1966

3,244,405
CABLE HOIST BRAKE
John R. Hanning, Bryan, Ohio, assignor to The Aro Corporation, Bryan, Ohio, a corporation of Ohio
Filed Feb. 17, 1964, Ser. No. 345,241
4 Claims. (Cl. 254—186)

This invention relates to a hoist brake particularly adapted for fluid pressure-operated hoists.

One object of the invention is to provide a brake which is so designed that it permits of gradual release during the lowering of the load with a minimum of torque required of the motor. This condition allows full use of the variable speed characteristics of a pneumatic motor during the lowering operation and permits superior slow speed or "inching" control in the descent direction.

Another object is to provide a brake construction in which ratchet means is provided for preventing lowering of the load during the raising and holding operations of the hoist, brake mechanism being associated with the ratchet wheel which serves as a clutch in relation thereto during the raising operation and as a releasable brake during the lowering operation.

Still another object is to provide mechanism in the form of a nut and screw connection between a fluid pressure motor and a hoisting drum wherein a ratchet wheel is gripped between flanges of the screw and nut which operate to effect such gripping and to efficiently and progressively release the grip to thus provide a descent brake when desired under accurate control by the operator by the throttling action applied to the motor.

With these and other objects in view, my invention consists in the construction, arrangement and combination of the various parts of my hoist brake, whereby the objects above contemplated are attained, as hereinafter more fully set forth, pointed out in my claims and illustrated in detail on the accompanying drawings, wherein:

FIG. 1 is a vertical sectional view through a hoisting drum, a pneumatic motor for rotating the same, step-down gearing between the motor and the drum and my hoist brake interposed between the motor shaft and the step-down gearing, the fluid pressure circuit for the apparatus being illustrated diagrammatically with the throttling valve in neutral or stopped position;

FIGS. 2 and 3 are diagrammatic views of the throttling valve in the "UP" and "DOWN" positions;

FIG. 4 is a vertical sectional view on the line 4—4 of FIG. 1 showing the step-down gearing and the cable on the drum, and FIG. 5 is a vertical sectional view on the line 5—5 of FIG. 1 showing the ratchet wheel and the holding pawl therefor.

On the accompanying drawings I have used the reference numeral 10 to indicate a motor and brake housing of tubular character which is provided with a mounting flange 12 for mounting the hoist unit on a suitable frame. A gear housing 14 forms an extension of the housing 10, being bolted thereto as by several bolts 15, one of which is shown in FIG. 1.

A pneumatic motor is provided in the form of a stator 16 having the usual eccentric bore as shown in FIG. 1, a rotor 18 being located therein and provided with slidable blades 20. The stator 16 has "UP" and "DOWN" ports U and D, respectively, as shown in the diagrammatic portion of FIG. 1 adjacent the right-hand end thereof.

A motor shaft 22 is shown having a splined connection 21 with a friction nut 24 provided with an internal thread 23. The nut 24 surrounds a friction screw 26 having an external thread 27. Balls 25 are interposed between the threads 23 and 27 to minimize friction.

A gearing input shaft 28 has a splined connection with the friction screw 26 and is adapted to rotate a cable drum 36 through step-down gearing comprising planetary pinions 30 rotatable on sleeves 33 carried by a gear cage 35 and in which are mounted drive studs 34 for the left-hand end of the drum, the right-hand end being journaled in a needle bearing 37. A cable on the drum is shown at 38. The pinions 30 mesh with an internal ring gear 32 which is stationary with respect to the gear housing 14.

The friction screw 26 has a flange 31 and the friction nut 24 has a flange 29 opposite the flange 31. Interposed between the flanges 29 and 31 is an anti-friction thrust bearing 52, a ratchet disc 54 and a friction disc 50.

Friction shoes 40 are adapted to coact with the back of the disc 29 (the right-hand surface thereof as shown in FIG. 1) and these may be in the form of rings carried by discs which have stems 42 slidable through O-ring seals and terminating at their right-hand ends in pistons 44 located in cylinders 46 which are stationary relative to the motor and brake housing 10. Piston springs 48 in groups of three are provided for the pistons 44 and normally engage the friction shoes 40 with the disc 29, there being two or more of the friction shoe and piston units as desired or required for a given installation.

Referring to FIG. 5 a ratchet pawl 56 is shown pivoted at 57 to the motor and brake housing 10. This pawl permits clockwise rotation of the ratchet disc 54 as viewed in FIG. 5 and prevents counterclockwise rotation thereof, being related to the cable 38 as shown in FIG. 4 in such manner as to normally prevent retrograde movement thereof and thereby holding the load against descent.

Referring next to the fluid pressure diagram at the right-hand end of FIG. 1 and to FIGS. 2 and 3, a control valve 62 is shown for throttling the pneumatic motor 16–18–20. The porting arrangement is such that when the valve 62 is in the position of FIG. 1 a fluid pressure inlet 58 is blocked, an exhaust to atmosphere indicated at 60 is blocked and the "UP" and "DOWN" ports U and D are blocked. This porting arrangement is conventional on throttle valves for pneumatically operated hoists.

The valve is modified to the extent that a branch connection 64 leads to all of the cylinders 46 and is provided with a bleed hole 70 to atmosphere adjacent each cylinder.

When the control valve 62 is adjusted for either up or down operation as shown in FIGS. 2 and 3, respectively, the inlet 58 is connected to the branch 64 as well as to the up or down port of the motor so as to effect operation of the pistons 44 for releasing the friction shoes 40 from the disc 29 against the bias of the springs 48. Some of the compressed air escapes through the bleed holes 70 but not enough to prevent the compressed air from actuating the pistons 44. When the control valve 62 is returned to the neutral position of FIG. 1, however, the branch connection 64 is blocked at the valve and bleeding of compressed air to atmosphere through the bleed holes 70 permits the springs 48 to re-engage the friction shoes 40 with the disc 29 which is the "normal" position of the parts.

*Practical operation*

When the control valve 62 is moved to the position of FIG. 2 for lifting a load, the friction shoes 40 release the disc 29 so that it can freely rotate with the motor and in doing so the nut 24 tends to screw onto the screw 26 thereby decreasing the distance between the flanges 29 and 31. This, through the thrust bearing 52 and the friction disc 50, causes frictional engagement between this disc, the flange 31 and the ratchet disc 54 for locking the parts 24–52–54–50–26 together to rotate as a unit, the ratchet disc rotating clockwise in FIG. 5 and held against retrograde movement by the pawl 56. Such clockwise rotation is transmitted through the gearing to the drum 36 for lifting the load on the cable 38 (arrow 39 in FIG. 4).

Whenever the control valve 62 is returned to the neutral position of FIG. 1 the motor could rotate in the down direction thus loosening the nut 24 on the screw 26 and letting the load slip because of loosening the friction disc 50 against the ratchet disc 54 if it were not for the friction shoes 40. They are urged by the springs 48 against the disc 29 and cooperate with the ratchet disc and pawl to hold the load against such retrograde movement. The load on the screw 26 now tends to screw it into the nut 24 thereby retaining the frictional engagement between 31, 50 and 54 for holding the load.

When it is desired to lower the load, the control valve 62 is moved to the position of FIG. 3 which rotates the motor in the down direction thus tending to unscrew the nut 24 from the screw 26. As soon as there is any looseness between the friction disc 50 and the parts 31 and 54, however, the load will start to descend and tend to rescrew the screw 26 into the nut 24 thus applying a braking force through the friction disc 50 that does not let the load descend any faster than dictated by the throttling of the motor which, of course, can be controlled by just "cracking" the valve 62 open in the down direction of its adjustment, and the speed of descent may thereby be nicely controlled because of permitting a gradual release of the brake. At the same time, this results in a minimum of torque required of the motor and effects an economy of use of the compressed air for operating the motor. The load can be "inched" in a descending direction under full control of the operator at all times. Also, the load can be stopped at any time desired by permitting the control valve 62 (which is generally centered as in FIG. 1 when released by the operator) to return to normal position and bleed the cylinders 46 to permit the springs 48 to re-engage the friction shoes 40 and thereby lock the motor and drum to the ratchet disc 54 which, of course, is held by the pawl 56.

Some changes may be made in the construction and arrangement of the parts of my hoist brake without departing from the real spirit and purpose of my invention, and it is my intention to cover by my claims any modified forms of structure or use of mechanical equivalents which may reasonably be included within the scope.

I claim as my invention:

1. For use with a motor operated hoist of the type having brake mechanism comprising a friction nut and screw connection from a motor to the drum of the hoist, the nut and screw thereof having opposed flanges which approach each other when the motor operates for raising a load, a ratchet disc between said flanges, and a pawl coacting therewith and operable to prevent retrograde rotation of said ratchet disc; means normally arresting rotation of that portion of said friction nut and screw connection located between said ratchet disc and the motor, the motor being fluid pressure operable and reversible, actuatable means for releasing said rotation arresting means, said actuatable means being fluid pressure operable, and means for supplying fluid pressure to said actuatable means whenever fluid pressure is supplied to the motor for rotating it in either direction.

2. The combination claimed in claim 1 wherein a friction disc is interposed between that portion of said friction nut and screw connection which is located between said ratchet disc and the hoist drum, and an anti-friction bearing is interposed between that portion of said friction nut and screw connection which is located between said ratchet disc and the motor.

3. The combination claimed in claim 2 wherein said means for normally arresting rotation of a portion of said friction nut and screw connection comprises a friction shoe, means to bias said shoe into arresting position, said actuatable means comprising a cylinder receiving fluid pressure from a control valve for the motor, and a piston therein operated by the fluid pressure in opposition to said biasing means.

4. The combination claimed in claim 3 wherein said control valve has an inlet, a pair of ports to opposite sides of the motor and an outlet, a slideable valve plunger movable to connect said inlet to either of said motor ports while connecting the other motor port to said outlet, port means leading to said cylinders, said plunger having means to connect said inlet to said port means whenever the plunger is in position for connecting one or the other of said motor ports to said inlet, and bleed means between said port means and said cylinders.

References Cited by the Examiner

UNITED STATES PATENTS

| | | | |
|---|---|---|---|
| 1,957,061 | 5/1934 | Goldberg | 192—15 |
| 2,447,439 | 8/1948 | Thompson | 192—7 |
| 2,656,736 | 10/1953 | Ebsworth | 188—170 |
| 2,669,427 | 2/1954 | Dowrelio | 254—187 |
| 2,695,086 | 11/1954 | Parker | 254—187 |
| 2,727,604 | 12/1955 | Robertson | 254—186 |

SAMUEL F. COLEMAN, *Primary Examiner.*